June 22, 1948.                H. C. KEMBLE                2,443,621
                                  MOLD
                            Filed Nov. 27, 1945

*INVENTOR.*
HERBERT C. KEMBLE

BY
*William D. Hall.*

ATTORNEY

Patented June 22, 1948

2,443,621

UNITED STATES PATENT OFFICE 2,443,621

MOLD

Herbert C. Kemble, Long Branch, N. J., assignor to the United States of America as represented by the Secretary of War Application November 27, 1945, Serial No. 631,198

3 Claims. (Cl. 18—34)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to molds and more particularly to transfer molds.

Transfer molds are so called because the molding material is placed in the tank chamber of the mold body and then forced through a sprued transfer plate into the molding chamber where the molded article is formed. The molding chamber usually includes a lower or female part and an upper or male part, the two said parts cooperating to determine the characteristics of the molded article, the said male part also functioning as the aforesaid transfer plate.

Two main disadvantages are inherent in transfer molds. The first disadvantage resides in the difficulty attendant in removing the molded article from the male part of the mold. It is necessary to pry the molded article loose from the mold, the prying often resulting in damage to the article. It is therefore a prime object of the invention to provide a means whereby molded articles may be removed from the male part of the mold, without damage to the article.

The second main disadvantage resides in the fact that the molded article is frequently connected to excess molding material in the tank chamber through the dross lying in the sprue of the transfer plate. Since the use of a sprue is necessary in molds of this type, it is another object of the invention to provide a means whereby the dross may be ruptured, thereby facilitating removal of the molded article from the male part of the mold.

These objects, together with other objects and advantages of the invention which will be apparent from a consideration of the following specification, are attained in a preferred embodiment of the invention by the use of a shearing plate and a plunger plate, the shearing plate providing a means whereby the dross may be ruptured and the male part of the mold severed from the excess molding material, and the plunger plate providing a means whereby the molded article may then be loosened from the male part of the mold.

Figure 1:
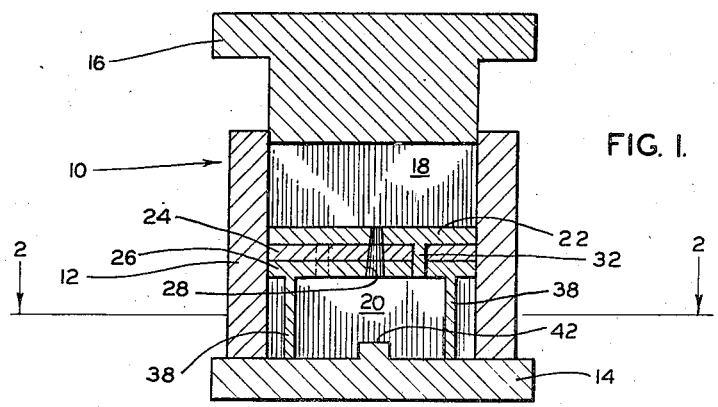
Figure 2:
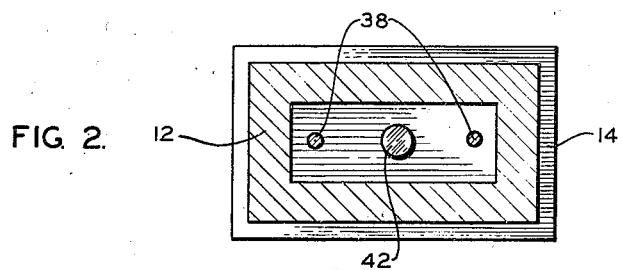
Figure 3:
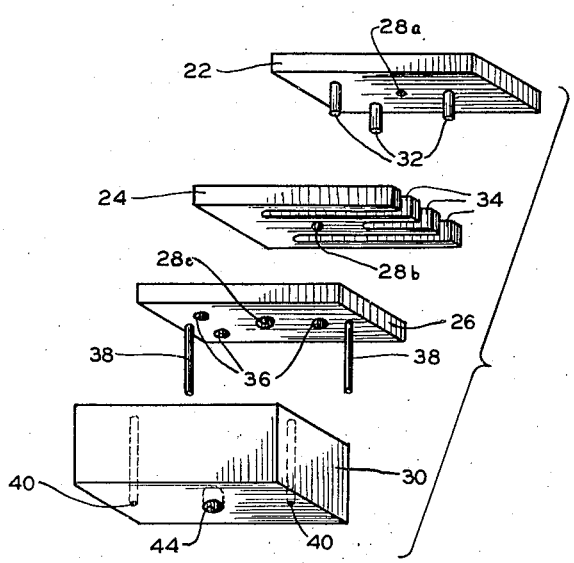

For a better understanding of the invention, reference is made to the following specification of a device embodying the invention, the said specification to be read in connection with the accompanying drawings, in which:

Figure 1 is a sectional view in elevation of a device embodying the invention, and Figure 2 is a sectional view along line 2—2 of the device shown in Figure 1, and Figure 3 is an exploded perspective view of a feature of the device shown in Figure 1, together with a perspective view of a molded article produceable by the device of Figure 1.

Referring to the drawings, a mold 10 includes a mold body 12, closed at the lower end by a female molding plate 14, and at the upper end by a head plate or plunger 16. The mold is internally divided into a tank chamber 18 and a molding chamber 20 by a plunger plate 22, a shear plate 24 and a male molding plate 26. The plates 22, 24 and 26 are arranged with their opposing faces contiguous with one another, and are severally apertured in register to provide a tapered sprue 28, whereby molding material placed in the tank chamber 18 may be forced by head plate 16 into the molding chamber 20. The shape of a molded article 30, Figure 3, produced by the mold 10 is determined by the configuration of the molding chamber 20, the configuration of said chamber 20 being governed by the shape of the upper surface of the female molding plate 14 and the lower surface of the male molding plate 26.

The plunger plate 22 is rectangular in form and is adapted to fit snugly the interior walls of the mold 10. The plate 22 is provided with a plurality of staggered, downwardly projecting pins 32 having a projection length equal to the combined thickness of the shear plate 24 and the male plate 26. The pins 32 are staggered in order that they may be slidably received by the shear plate 24.

The shear plate 24 is also rectangular in form and has the outside dimensions of the plunger plate 22. The shear plate 24 is provided with a plurality of slots 34 having a width complementary to the width of the pins 32 and a length equal to the distance that its complementary pin 32 is set back from a corresponding end of the plunger plate 22, the shear plate 24 thus being adapted to be slidably positioned contiguous to the lower side of the plunger plate 22.

The male plate 26 of the mold 10 is also rectangular in form and has the outside dimensions of the plunger plate 22 and the shear plate 24. The male plate 26 is provided with a plurality of staggered apertures 36, corresponding in size and location to the pins 32 of the plunger plate 22. The male plate 26 is further provided with downwardly projecting members 38, the said members 38 serving to determine the location of channels 40 in the molded article 30.

The plunger plate 22, the shear plate 24 and the male plate 26 are further provided, as shown in Figure 3, with downwardly tapered perforations 28a, 28b and 28c respectively, the said perforations, when the plates are stacked and the perforations in register, combining to form the tapered sprue 28.

As heretofore stated, the downwardly projecting members 38 of male plate 26 serve to determine the location of the channels 40 of the molded article 30. Similarly, the upwardly projecting member 42 of female molding plate 14 serves to determine the size and location of recess 44 in the molded article 30. It is obvious that differently shaped mold plates 14 and 26 could be used to produce a differently shaped molded article 30.

A preferred embodiment of the invention having thus been described, its operation will now be described with the view of illustrating the ease with which a molded article may be removed from a mold incorporating the features of the invention.

A quantity of molding material, such as a thermosetting mixture, is placed in the tank compartment 18. The mold is then placed in a hydraulic press, not shown, and pressure is applied between the female plate 14 and the displaceable head plate 16, thereby forcing the molding material through the sprue 28 and into the molding chamber 20. When the material has set, the pressure is released and the female plate 14 and the head plate 16 are removed. The molded article 30, together with the male plate 26, the shear plate 24 and the plunger plate 22 may then be removed from the mold 10 as a unit, together with any excess molding material lying on the upper surface of the plunger plate 22.

In order to remove the molded article 30 from the male plate 26, it will first be necessary to rupture the dross lying in the sprue 28 and then slide the molded article 30 off the member 38. The dross is ruptured by movement of the shear plate 24 as allowed by the slots 34, whereby the dross lying within that portion of the sprue 28 that is formed by the perforation 28b is removed from the mass of dross. Movement of shear plate 24 may be caused by clamping firmly the plate 26 and applying pressure to the slotted end of the plate 24.

Although a slight movement of the shear plate 24 is sufficient to rupture the dross, the shear plate is completely removed in order that the plunger plate 22 may be utilized to loosen the molded article from the members 38. It will be seen that, the shear plate 24 having been removed, the plunger plate 22 may be moved toward the male plate 26, thereby forcing the pins 32 against the article 30 and causing the said article to slide along the members 38. Although the pins 32 can only move the article 30 a distance equal to the thickness of the shear plate 24, the movement is sufficient to loosen the article and it may then readily be removed from the members 38.

It will be obvious that many modifications of this device are possible, the above described device being shown solely for the purpose of illustrating the invention. Further, it will be obvious that the features of the invention may be applied to other types of molds, such as compression and jet molds. The invention is fully pointed out and defined in the attached claims.

What is claimed is:

1. In a mold, a hollow mold body, a plurality of contacting plates contained within said body and including a mold plate, a plunger plate, and a shear plate between the mold plate and plunger plate, a knock-out pin extending from the plunger plate, through the shear plate and into apertures extending through the mold plate, said plates having a sprue extending therethrough, the shear plate having an open-ended slot through which passes the knock-out pin, the shear plate being thereby slidably removable from between the mold and plunger plates, the knock-out pin being of such length that, upon removal of the shear plate, it may be forced against the product adhering to the mold plate to separate the former from the latter.

2. In a mold, a hollow mold body, a plurality of contacting plates contained within said body and dividing the body cavity into a tank chamber and a molding chamber and including a mold plate, a plunger plate, and a shear plate between the mold and plunger plates, a knock-out pin extending from the plunger plate, through the shear plate and into apertures extending through the mold plate, said plates having a sprue extending therethrough, a plunger for forcing the molding material from the tank chamber, through the sprue and into the mold chamber, the shear plate having an open-ended slot through which passes the knock-out pin, the shear plate being thereby slidably removable from between the engaged mold and plunger plates, the knock-out pin being of such length that, upon removal of the shear plate, it may be forced against the product adhering to the mold plate to separate the former from the latter.

3. In a mold, a hollow mold body, a plurality of contacting parallel plates contained within said body and dividing the body cavity into a tank chamber and a molding chamber and including a mold plate, a plunger plate, and a shear plate between the mold and plunger plates, a knock-out pin extending from the plunger plate, through the shear plate and into apertures extending through the mold plate, said plates having a sprue extending therethrough, a plunger for forcing the molding material from the tank chamber, through the sprue and into the mold chamber, the shear plate having open-ended slots through which pass the knock-out pins, the shear plates being thereby slidably removable from between the engaged mold and plunger plates, the knock-out pins being of such length that, upon removal of the shear plate, they may be forced against the product adhering to the mold plate to separate the former from the latter.

HERBERT C. KEMBLE.

REFERENCES CITED

The following references are of record in the file of this patent:

UNITED STATES PATENTS

| Number | Name | Date |
|---|---|---|
| 2,274,279 | Shaw | Feb. 24, 1942 |
| 2,300,759 | Amigo | Nov. 3, 1942 |
| 2,372,177 | Conner | Mar. 27, 1945 |